United States Patent
Gray, II et al.

(10) Patent No.: US 9,282,028 B2
(45) Date of Patent: Mar. 8, 2016

(54) METHOD AND SYSTEM FOR TCP X.25 CONNECTIVITY

(75) Inventors: Robert Allen Gray, II, Garland, TX (US); Lonny Jay Weckerly, Allen, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1073 days.

(21) Appl. No.: 12/336,860

(22) Filed: Dec. 17, 2008

(65) Prior Publication Data

US 2010/0150152 A1 Jun. 17, 2010

(51) Int. Cl.
*H04L 12/751* (2013.01)
*H04L 12/46* (2006.01)

(52) U.S. Cl.
CPC ............ *H04L 45/10* (2013.01); *H04L 12/4633* (2013.01)

(58) Field of Classification Search
None
See application file for complete search history.

(56) References Cited

U.S. PATENT DOCUMENTS

| | | | | |
|---|---|---|---|---|
| 5,544,303 A | * | 8/1996 | Maroteaux et al. | 715/733 |
| 5,559,800 A | * | 9/1996 | Mousseau et al. | 370/401 |
| 5,644,594 A | * | 7/1997 | Johnson et al. | 375/222 |
| 6,088,754 A | * | 7/2000 | Chapman | 710/305 |
| 6,320,874 B1 | * | 11/2001 | Crump et al. | 370/466 |
| 6,411,806 B1 | * | 6/2002 | Garner et al. | 455/428 |
| 6,484,206 B2 | * | 11/2002 | Crump et al. | 709/227 |
| 6,597,704 B1 | * | 7/2003 | Wong | 370/466 |
| 6,618,359 B1 | * | 9/2003 | Chen et al. | 370/242 |
| 7,215,682 B2 | * | 5/2007 | Watanabe | 370/466 |
| 7,516,211 B1 | * | 4/2009 | Gourlay et al. | 709/224 |
| 7,656,809 B2 | * | 2/2010 | Cordsmeyer et al. | 370/241 |
| 2002/0078208 A1 | * | 6/2002 | Crump et al. | 709/227 |
| 2003/0035439 A1 | * | 2/2003 | Watanabe | 370/466 |
| 2006/0120402 A1 | * | 6/2006 | Gallant | 370/466 |
| 2007/0109995 A1 | * | 5/2007 | Quigley et al. | 370/329 |
| 2008/0159292 A1 | * | 7/2008 | Jiang et al. | 370/392 |

\* cited by examiner

*Primary Examiner* — Hicham Foud

(57) ABSTRACT

Techniques for providing a method and system for TCP to X.25 connectivity are disclosed. In one particular exemplary embodiment, the techniques may be realized as a method, comprising configuring, via at least one processor, an X.25 switch for direct communication with a TCP/IP based network device, configuring, via at least one processor, X.25 packet encapsulation software on the TCP/IP based network device, provisioning, via at least one processor, one or more X.25 PVCs on the X.25 switch, provisioning, via at least one processor, one or more PVCs on the TCP/IP based network device, and routing network traffic directly between the TCP/IP based network device and the X.25 switch.

20 Claims, 4 Drawing Sheets

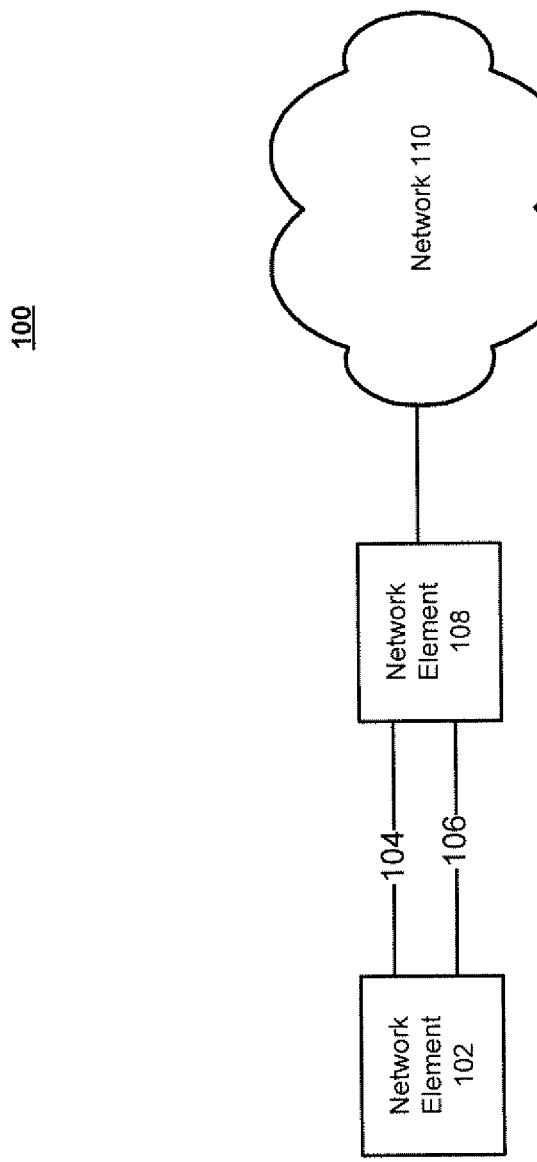

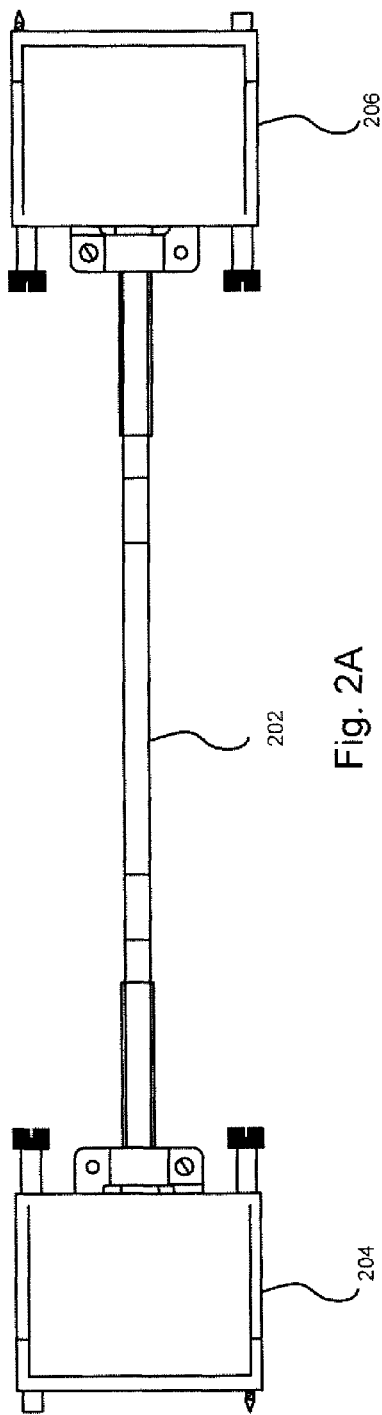

Fig. 3A

| CABLE ASSEMBLY INFORMATION | | | | | |
|---|---|---|---|---|---|
| CONNECTOR #1 | | | | CONNECTOR #2 | |
| PIN | COLOR CODE | PAIR | COLOR CODE | PIN | |
| A | DRAIN WIRE | 1/2 | DRAIN WIRE | A | |
| B | GRAY | 1/2 | 1/2 | B | |
| C | GRN/WHT | 3 | GRN/WHT | C | |
| D | BRN/WHT | 4 | BRN/WHT | D | |
| E | SLT/WHT | 5 | SLT/WHT | E | |
| F | BLU/RED | 6 | BLU/RED | F | |
| H | ORN/RED | 7 | ORN/RED | H | |
| K | ORN/BLK | 12 | ORN/BLK | K | |
| P | BLU/WHT | 1 | BLU/WHT | P | |
| R | ORN/WHT | 2 | ORN/WHT | R | |
| S | WHT/BLU | 1 | WHT/BLU | S | |
| T | WHT/ORN | 2 | WHT/ORN | T | |
| U | BLU/BLK | 11 | BLU/BLK | U | |
| V | BRN/RED | 9 | BRN/RED | V | |
| W | BLK/BLU | 11 | BLK/BLU | W | |
| X | RED/BRN | 9 | RED/BRN | X | |
| Y | GRN/RED | 8 | GRN/RED | Y | |
| AA | RED/GRN | 8 | RED/GRN | AA | |
| TIE BACK | WHT/GRN | 3 | WHT/GRN | TIE BACK | |
| TIE BACK | WHT/BRN | 4 | WHT/BRN | TIE BACK | |
| TIE BACK | WHT/SLT | 5 | WHT/SLT | TIE BACK | |
| TIE BACK | RED/BLU | 6 | RED/BLU | TIE BACK | |
| TIE BACK | RED/ORN | 7 | RED/ORN | TIE BACK | |
| TIE BACK | RED/SLT | 10 | RED/SLT | TIE BACK | |
| TIE BACK | SLT/RED | 10 | SLT/RED | TIE BACK | |
| TIE BACK | BLK/ORN | 12 | BLK/ORN | TIE BACK | |

Fig. 3B

| CABLE FUNCTIONS | | | | | |
|---|---|---|---|---|---|
| CONNECTOR #1 | | COLOR CODE | CONNECTOR #2 | | |
| FUNCTION #1 | PIN | | PIN | FUNCTION #2 | |
| FG | A | DRAIN WIRE | A | FG | |
| TD (A) | P | BLU/WHT | P | TD (A) | |
| TD (B) | S | WHT/BLU | S | TD (B) | |
| RD (A) | R | ORN/WHT | R | RD (A) | |
| RD (B) | T | WHT/ORN | T | RD (B) | |
| RTS | C | GRN/WHT | C | RTS | |
|  | NOT USED | WHT/GRN | NOT USED |  | |
| CTS | D | BRN/WHT | D | CTS | |
|  | NOT USED | WHT/BRN | NOT USED |  | |
| DSR | E | SLT/WHT | E | DSR | |
|  | NOT USED | WHT/SLT | NOT USED |  | |
| DCD | F | BLU/RED | F | DCD | |
|  | NOT USED | RED/BLU | NOT USED |  | |
| DTR | H | ORN/RED | H | DTR | |
|  | NOT USED | RED/ORN | NOT USED |  | |
| TC (A) | Y | GRN/RED | Y | TC (A) | |
| TC (B) | AA | RED/GRN | AA | TC (B) | |
| RC (A) | V | BRN/RED | V | RC (A) | |
| RC (B) | X | RED/BRN | X | RC (B) | |
|  | NOT USED | RED/SLT | NOT USED |  | |
|  | NOT USED | SLT/RED | NOT USED |  | |
| XTC (A) | U | BLU/BLK | U | XTC (A) | |
| XTC (B) | W | BLK/BLU | W | XTC (B) | |
| LOC/TST | K | ORN/BLK | K | LOC/TST | |
|  | NOT USED | BLK/ORN | NOT USED |  | |
| SG | B | GRAY | B | SG | |

METHOD AND SYSTEM FOR TCP X.25 CONNECTIVITY

BACKGROUND INFORMATION

Communication between X.25 based networks and other networks, such as, a TCP/IP based network, may require the use of legacy equipment for the interface, such as a Packet Assembler/Disassembler (PAD) and a terminal server. The legacy equipment may be difficult to configure, it may no longer be supported by a manufacturer, replacement components or service may be difficult to obtain, and/or personnel with expertise associated with the legacy equipment may be difficult to find. Furthermore, the legacy equipment may not support one or more standards of a user's network, such as security standards.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 1 is a schematic of a system for TCP X.25 connectivity, in accordance with an exemplary embodiment.

FIG. 2A, depicts a physical coupler for TCP X.25 connectivity, in accordance with an exemplary embodiment.

FIG. 2B, depicts a first end of a physical coupler for TCP X.25 connectivity, in accordance with an exemplary embodiment.

FIG. 2C, depicts a second end of a physical coupler for TCP X.25 connectivity, in accordance with an exemplary embodiment.

FIG. 3A depicts a wiring chart for a physical coupler for TCP X.25 connectivity, in accordance with an exemplary embodiment.

FIG. 3B depicts a functionality mapping of pins from end to end of a physical coupler for TCP X.25 connectivity, in accordance with an exemplary embodiment.

DETAILED DESCRIPTION OF PREFERRED EMBODIMENTS

Figure 4:
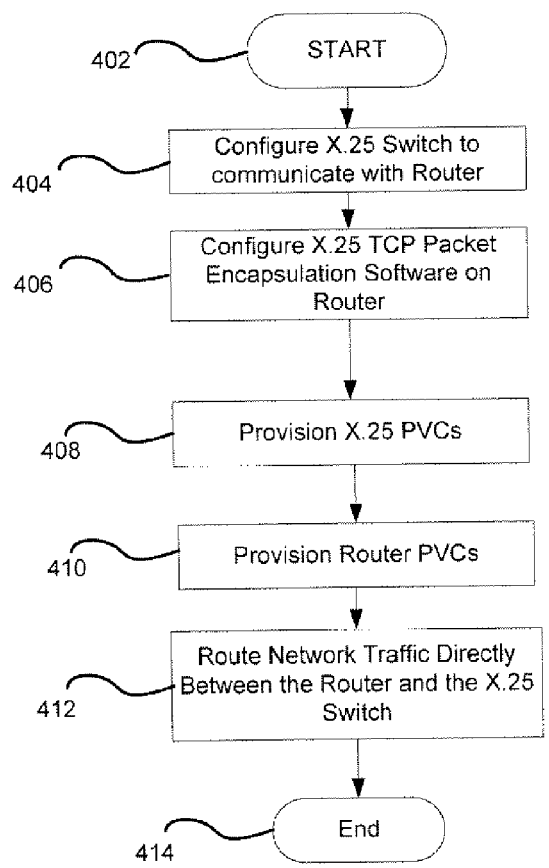
FIG. 4 depicts a flow chart for a method for implementing TCP X.25 connectivity, in accordance with an exemplary embodiment.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a system for TCP X.25 connectivity. The system for TCP X.25 connectivity may enable direct communication between a TCP/IP based network and a X.25 based network.

Referring to FIG. 1, a system for TCP X.25 connectivity in accordance with an exemplary embodiment is illustrated. System 100 illustrates an exemplary system for TCP to X.25 connectivity without the use of legacy equipment such as Packet Assembler/Disassembler (PAD) or terminal server equipment. It is noted that system 100 is a simplified view of a network and may include additional elements that are not depicted. As illustrated, the system 100 may include one or more networks, such as network 110. One or more network elements, such as network elements 102 and 108 may be communicatively coupled to network 110. Network elements 102 and 108 may be communicatively coupled via cables 104 and 106.

As described in greater detail with reference to FIGS. 2 and 3 below, cables 104 and 106 may be cables built for a X.25 class 5 switch asynchronous communications link. This communications link may use the X.25 protocol at layer 3 over a V.35 interface on the physical level. Multiple channelized Permanent Virtual Circuits (PVCs) may be assigned to this interface, each PVC may represent individual switch communications ports. On the network element 102 side, a proprietary cable with a proprietary 34 pin male connector may be used. This may be a V.35 cable. On the network element 108 side, a DB60-to-34 Pin female connector may be used. Although two cables are illustrated, only 1 cable may be required to provided connectivity. Furthermore, additional cables may be used.

Network 110 may be local area networks (LAN), wide area networks (WAN), the Internet, a Public Switched Telephone Network (PSTN), cellular networks, satellite networks, or other networks that permit the transfer and/or reception of data.

Network elements 102 and 108 may include one or more processors (not shown) for recording, transmitting, receiving, and/or storing data. Although network elements 102 and 108 are depicted as individual devices, it should be appreciated that the contents of network elements 102 and 108 may be combined into fewer or greater numbers of devices and may be connected to one or more data storage systems (not shown). Data storage systems may be local or remote to network elements 102 and 108. In one or more embodiments, network element 102 may be connected to an X.25 network.

In one or more embodiments, network element 102 may be an X.25 switch, such as for example, an Electronic Worldwide Switch Digital (EWSD) Class 5 switch. Network element 108 may be a component on a TCP/IP based network, such as a router, a switch or other network component supporting TCP/IP based network traffic. Cables 104 and 106 may allow direct connections between network element 102 and 108. Profiles may be set on network element 102 and/or network element 108 to enable handshaking and communication.

Network element 108 may contain software to encapsulate X.25 packets and enable routing of X.25 packets through TCP/IP connections. This may provide an alternative connection mechanism to the use of Link Access Procedure Balanced (LAPB) based links. In one or more embodiments, network element 108 may use Cisco™ X.25 Over TCP (XOT) software. The use of cables 104 and/or 106, settings and/or profiles on network elements 102 and 108, and packet encapsulation software on network element 108 may enable direct connectivity between network elements 102 and 108 without the use of PAD equipment and/or terminal server equipment.

Network element 108 may use a profile to specify one or more settings to facilitate communication with network element 102. The profile may be configured by a user via an interface on the network element itself or via a terminal or computer and remote access to network element 108. The profile configurations may be implemented by a processor associated with network element 108. For example, network element 108 may be a router, such as a Cisco router, and a port configuration may enable the connection of the configured router port to an interface on network element 102. An exemplary port configuration (e.g., for a Cisco router) is listed below.

```
!
version 12.3
service pad to-xot
service tcp-keepalives-in
service tcp-keepalives-out
service timestamps debug datetime msec localtime
service timestamps log datetime localtime show-timezone
service password-encryption
service linenumber
!
x29 profile EWSDunix 1:0 2:0 3:20 4:0 5:0 6:5 7:16 20:255
x29 profile EWSDVT100 1:1 2:1 3:50 4:0 5:2 6:5 7:2 12:1 13:4 15:1 16:8 17:24 18:18 19:2
20:176 21:3
!
!
interface Serial2/1
description EWSD pad connection v35
no ip address
encapsulation x25
no ip mroute-cache
x25 address 23456789
x25 ltc 36
x25 htc 85
x25 ips 256
x25 ops 256
clockrate 64000
lapb T2 300
lapb N2 7
!
!
translate tcp 125.25.25.25 port 1001 x25 23456789 pvc 1 packetsize 256 256 windowsize 5 5 no-
reset profile EWSDVT100 max-users 1
translate tcp 125.25.25.25 port 1002 x25 23456789 pvc 2 packetsize 256 256 windowsize 5 5 no-
reset profile EWSDVT100 max-users 1
translate tcp 125.25.25.25 port 1004 x25 23456789 pvc 4 packetsize 256 256 windowsize 5 5 no-
reset profile EWSDVT100 max-users 1
translate tcp 125.25.25.25 port 1005 x25 23456789 pvc 5 packetsize 256 256 windowsize 5 5 no-
reset profile EWSDVT100 max-users 1
translate tcp 125.25.25.25 port 1006 x25 23456789 pvc 6 packetsize 256 256 windowsize 5 5 no-
reset profile EWSDVT100 max-users 1
translate tcp 125.25.25.25 port 1007 x25 23456789 pvc 7 packetsize 256 256 windowsize 5 5 no-
reset profile EWSDVT100 max-users 1
translate tcp 125.25.25.25 port 1008 x25 23456789 pvc 8 packetsize 256 256 windowsize 5 5 no-
reset profile EWSDVT100 max-users 1
translate tcp 125.25.25.25 port 1009 x25 23456789 pvc 9 packetsize 256 256 windowsize 5 5 no-
reset profile EWSDVT100 max-users 1
translate tcp 125.25.25.25 port 1010 x25 23456789 pvc 10 packetsize 256 256 windowsize 5 5
no-reset profile EWSDVT100 max-users 1
translate tcp 125.25.25.25 port 1003 x25 23456789 pvc 3 packetsize 256 256 windowsize 5 5 no-
reset profile EWSDVT100 max-users 1
access-list 99 deny any log
snmp-server trap-source Loopback0
snmp-server packetsize 8192
snmp-server enable traps snmp authentication linkdown linkup coldstart warmstart
!
x25 route 23456789 interface Serial2/1
```

As listed above, the following statement on the router may set terminal emulation parameters and specify a destination Operating System (OS) type:

```
x29 profile EWSDunix 1:0 2:0 3:20 4:0 5:0 6:5 7:16 20:255
x29 profile EWSDVT100 1:1 2:1 3:50 4:0 5:2 6:5 7:2 12:1 13:4
15:1 16:8 17:24 18:18 19:2 20:176 21:3
```

As listed above, the statement "x25 address 23456789" may assign a X.25 address to an interface for the routers internal use. The address may not be a real world addressable address, but may be used for the router's mappings. The router may then map one or more Permanent Virtual Circuits (PVCs) to one or more PVCs or channels of the X.25 switch. Other parameters may be set including timers such as the timer set by "lapb T2 300" and the maximum number of times a frame may be resent as set by the parameter "Lapb N2 7".

These parameters may be used to synchronize communication with an X.25 network component. The parameters "x25 ips 256" and "x25 ops 256" may determine an incoming packet size and an outgoing packet size respectively for a router. These settings may correspond to similar values set on an X.25 network component connected to the router by cable 104 or 106.

The configuration of network element 102 may be an X.25 switch configuration, such as an EWSD switch port configuration. The configuration may be edited by a user via an interface on network element 102 itself or via a terminal or computer and remote access to network element 102. The configuration modifications may be implemented by a processor associated with network element 102. An exemplary switch port configuration (e.g., for a EWSD switch) is listed below.

```
DISPX25LINK:X25LINK=1; EXEC'D
X25LINK=1 LAU =0 CHAN =1
OST =ACT L1PST=VIF ACTTVE
L2PST=ACTIVE
NET =X25LC PRTCL=X25 PRTCLVAR=
L1DTT=DTE L1IF =V35 L1MCA=1 L1BAUD=B56000
L2DTT=DCE L2LAM=INITIA L2K =7 L2N1 =263 L2N2 =7
L2T1 =3000 L2T2 =300 L2T3 =20000
L3DTT=DCE L3R20=1 L3R22=3 L3R23 =1
L3T10=60 L3T11=180 L3T12=60 L3T13 =60 L3T24=60
L3T20=180 L3T21=200 L3T22=180 L3T23 =60 L3T25=150
L3ICB= 0 L3TCB= 0 L3OCB = 0
FACILITY=NONE MASKNO:07793
DISPX25PVC:X25LINK=1; EXEC'D
LIST OF FOUND PVCS: MASKNO:07865
PVCNAM ADRNAM APPLL APPLR PRONAM LK CHNO WND PCKSZ STATUS OR
I/O IN/OUT TYPE
+-------+--------+-----+----+--------+--+----+--------+----------
THPVC028 OSIROM25 TH25 DIAL1 RTR03 1 3 5-5 256- 256 OPERATING
THPVC026 OSIROM07 TH25 DIAL1 RTR01 1 1 5-5 256- 256 OPERATING
THPVC027 OSIROM24 TH25 DIAL1 RTR02 1 2 5-5 256- 256 OPERATING
THPVC029 OSIROM26 TH25 DIAL1 RTR04 1 4 5-5 256- 256 OPERATING
THPVC030 OSIROM27 TH25 DIAL1 RTR05 1 5 5-5 256- 256 OPERATING
THPVC031 OSIROM28 TH25 DIAL1 RTR06 1 6 5-5 256- 256 OPERATING
THPVC032 OSIROM29 TH25 DIAL1 RTR07 1 7 5-5 256- 256 OPERATING
THPVC033 OSIROM30 TH25 DIAL1 RTR08 1 8 5-5 256- 256 OPERATING
THPVC034 OSIROM31 TH25 DIAL1 RTR09 1 9 5-5 256- 256 OPERATING
THPVC035 OSIROM32 TH25 DIAL1 RTR10 1 10 5-5 256- 256 OPERATING
DISPOSIADR:ADRNAM=X; EXEC'D
NET ADRNAM/ PRONAM/ NSADR
LOCADR APPLID
-----+--------+--------+---------------------------
X25LC OSIROM07 RTR01 48-0-112101
OSILTH25 DIAL1
X25LC OSIROM24 RTR02 48-0-112102
OSILTH25 DIAL1
X25LC OSIROM25 RTR03 48-0-112103
OSILTH25 DIAL1
X25LC OSIROM26 RTR04 48-0-112104
OSILTH25 DIAL1
X25LC OSIROM27 RTR05 48-0-112105
OSILTH25 DIAL1
X25LC OSIROM28 RTR06 48-0-112108
OSILTH25 DIAL1
X25LC OSIROM29 RTR07 48-0-112109
OSILTH25 DIAL1
X25LC OSIROM30 RTR08 48-0-112130
OSILTH25 DIAL1
X25LC OSIROM31 RTR09 48-0-112131
OSILTH25 DIAL1
X25LC OSIROM32 RTR10 48-0-112132
OSILTH25 DIAL1
DISPPRO:PRONAM=X; EXEC'D
PROCESSORS IN THE O&M-NETWORK
PRONAM PROTYP SYT PART1
SYT PART2
---------+-------+----------------------------------------
RTR01 ANSI
RTR02 ANSI
RTR03 ANSI
RTR04 ANSI
RTR05 ANSI
RTR06 ANSI
RTR07 ANSI
RTR08 ANSI
RTR09 ANSI
RTR10 ANSI
DISPAPPL:APPLID=X; EXEC'D
APPLICATIONS IN THE O&M-NETWORK
APPLID PRONAM SERVID ADRNAM1 ADRNAM2 AUT SSID PSID
------+--------+--------+--------+------+--------+--------
DIAL1 RTR01 OSIROM07 1
DIAL1 RTR02 OSIROM24 1
DIAL1 RTR03 OSIROM25 1
DIAL1 RTR04 OSIROM26 1
DIAL1 RTR05 OSIROM27 1
DIAL1 RTR06 OSIROM28 1
DIAL1 RTR07 OSIROM29 1
DIAL1 RTR08 OSIROM30 1
```

```
DIAL1 RTR09 OSIROM31 1
DIAL1 RTR10 OSIROM32 1
```

As listed above, the first thirteen lines of the exemplary X.25 profile may configure a port of an EWSD X.25 switch to communicate with a TCP/IP based router. For example, the statement "L2N1=263 L2N2=7" may specify a packet size of 256 bytes, which may correspond to a setting on network element 108, and/or the exemplary Cisco profile setting above. The L2N2 may correspond to the layer 2 setting indicating the number of times a packet may be sent specified in the exemplary router configuration as "lapb N2 7." Other settings may include the baud rate for a link "L1BAUD=B56000" and the interface type specification "V35". The remaining lines may depict the declaration of a plurality of OS processor names, the association of OSI processor names to applications, the declaration of OSI addresses, and the mapping of PVCs to channels on a physical link (e.g., cable 104 or 106) using the OSI addresses.

The various components of the system 100 as shown in FIG. 1 may be further duplicated, combined and/or integrated to support various applications and platforms. Additional elements may also be implemented in the systems described above to support various applications.

Referring to FIG. 2A, a physical coupler for TCP to X.25 connectivity is depicted, in accordance with an exemplary embodiment. As depicted cable 202 may be a V.35 34 pin male to 34 pin female cable adaptor. Cable connector 204 may be a 34 pin male connector for connecting to a X.25 network element, such as network element 102. Cable connector 206 may be a 34 pin female connector for connecting to a TCP/IP network device, such as network element 108.

Referring to FIG. 2B, a first end of a physical coupler for TCP X.25 connectivity is depicted, in accordance with an exemplary embodiment. FIG. 2B may depict an end view of cable connector 204 of FIG. 2A. Connector 208 depicts a plurality of labeled pins, such as pin 210. The label on the pin may correspond to the pin label on FIGS. 3A and 3B under the column labeled connector 1.

Referring to FIG. 2C, a second end of a physical coupler for TCP to X.25 connectivity is depicted, in accordance with an exemplary embodiment. FIG. 2C may depict an end view of cable connector 206 of FIG. 2A. Connector 212 depicts a plurality of labeled pins, such as pin 214. The label on the pin may correspond to the pin label on FIGS. 3A and 3B under the column labeled connector 2.

Referring to FIG. 3A, a wiring chart for a physical coupler for TCP to X.25 connectivity is depicted, in accordance with an exemplary embodiment. The pins of connector #1 may correspond to like labeled pins of FIG. 2B. The pins of connector #2 may correspond to like labeled pins of FIG. 2C. In one or more embodiments, the 18 pins used in this configuration may be straight through (i.e., like pin labels on one connector may map to like pin labels on a connector on the opposite end of a cable, e.g. Pin A to Pin A) with the exception of Pin C to Pin H. Pin C (corresponding to functionality for Request To Send (RTS)) may be jumpered to Pin H (corresponding to functionality for Data Terminal Ready (DTR)). This may provide the DTR high signal needed when the direct cable connection is used. The phrase "Tie Back" may refer to leaving a specified color of wire capped off or unconnected so that it is not used in the assembly.

FIG. 3B depicts a functionality mapping of pins from end to end of a physical coupler for TCP X.25 connectivity, in accordance with an exemplary embodiment. The pins of connector #1 may correspond to like labeled pins of FIG. 2B. The pins of connector #2 may correspond to like labeled pins of FIG. 2C. The exemplary pin-out depicted in FIG. 3B may use the following acronyms which may be compliant with a V.35 interface: Frame Ground (FG), Transmit Data A (TD(A)), Transmit Data B (TD(B)), Receive Data A (RD(A)), Receive Data B (RD(B)), Request To Send (RTS), Clear To Send (CTS), Data Set Ready (DSR), Data Carrier Detect (DCD), Data Terminal Ready (DTR), Transmit Clock A (TC(A)), Transmit Clock B (TC(B)), Receive Clock A (RC(A)), Receive Clock B (RC(B)), Transmit Clock A (XTC(A)), Transmit Clock B (XTC(B)), Local Test (LOC/TST), and Signal Ground (SG). This exemplary pin out diagram may be a mapping of functionality used to transmit data, control, and handshaking information between two network elements, each connected to one end of the exemplary cable.

FIG. 4 depicts a flowchart of a method for implementing a gateway transfer system 400, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 402.

At block 404, an X.25 network element, such as network element 102, may be configured, such as network element 102, to communicate with a TCP/IP based network element, such as network element 108. Configuration may include one or more settings as described in reference to FIG. 1 above. Configuration may enable setting the synchronization of a window size, packet size, timings and other protocol controls between network elements 102 and 108. A user may configure a X.25 network element, such as network element 102, via an interface on network element 102 itself or via a terminal or computer and remote access to network element 102. The configuration may be implemented by a processor associated with network element 102.

At block 406, X.25 TCP packet encapsulation software on network element 108 may be configured. Packet encapsulation software may be custom software enabling encapsulation of X.25 packets and enabling routing of X.25 packets through TCP/IP connections. This may provide an alternative connection mechanism to the use of Link Access Procedure Balanced (LAPB) based links. In one or more embodiments, method 400 may use Cisco™ X.25 Over TCP (XOT) software. A user may configure network element 108 via an interface on network element 108 itself or via a terminal or computer and remote access to network element 108. The configuration may be implemented by a processor associated with network element 108.

At block 408, one or more X.25 PVCs may be provisioned. For example, one or more PVCs may be provisioned on network element 102. A user may provision one or more PVCs via an interface on network element 102 itself or via a computer or terminal and remote access to network element 102. The provisioning commands may be received and executed by a processor associated with network element 102.

At block 410, one or more PVCs on the TCP/IP based network side may be provisioned, such as on network element 108. A user may provision one or more PVCs via an interface on network element 108 itself or via a computer or terminal and remote access, such as telnet, to network element 108. The provisioning commands may be received and executed by a processor associated with network element 108.

At block 412, network traffic may be routed directly between a TCP/IP based network element, such as a router, and an X.25 network element. For example network traffic may be routed between network elements 102 and 108. Profiles and/or settings may map the PVCs on the X.25 side and PVCs on the TCP/IP side and enable the communication. The direct physical connection may use the cable described above in reference to FIGS. 2A, 2B, 2C, 3A, and 3B.

At block 414, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer implemented method, comprising:
   accessing, via at least one processor, a profile specifying at least one setting to facilitate communication with a TCP/IP based network device;
   configuring, via at least one processor, an X.25 switch for direct communication with the TCP/IP based network device;
   configuring, via at least one processor, X.25 packet encapsulation software on the TCP/IP based network device, wherein the X.25 packet encapsulation software encapsulates entire X.25 packets allowing routing of X.25 packets over TCP/IP connections;
   provisioning, via at least one processor, one or more X.25 PVCs on the X.25 switch;
   provisioning, via at least one processor, one or more PVCs on the TCP/IP based network device;
   mapping, within the TCP/IP based network device, a plurality of PVCs on the TCP/IP based network to at least one X.25 PVC; and
   routing network traffic directly between the TCP/IP based network device and the X.25 switch.

2. The method of claim 1, wherein the TCP/IP based network device is a router.

3. The method of claim 1, wherein the X.25 packet software on the TCP/IP based network device comprises Cisco X.25 Over TCP (XOT) software.

4. The method of claim 1, wherein configuring an X.25 switch for direct communication with a TCP/IP based network device comprises configuration of one or more ports to communicate with the TCP/IP based network device.

5. The method of claim 4, wherein the X.25 switch port configuration comprises setting a Data Terminal Equipment (DTE) baud rate.

6. The method of claim 4, wherein the X.25 switch port configuration comprises setting a Data Circuit-terminating Equipment (DCE) packet size.

7. The method of claim 1, wherein configuring X.25 packet encapsulation software on the TCP/IP based network device comprises setting an incoming packet size and an outgoing packet size to match a packet size of the X.25 switch.

8. The method of claim 1, wherein routing network traffic directly between the TCP/IP based network device and the X.25 switch comprises a physical connection between a port of the TCP/IP based network device and a port of the X.25 switch.

9. The method of claim 8, wherein configuring X.25 packet encapsulation software on the TCP/IP based network device comprises assigning a X.25 address to an internal interface of the TCP/IP based network device for the use of the TCP/IP based network device, wherein the X.25 address does not comprise a real world addressable address.

10. The method of claim 8, wherein the physical connection uses a V.35 interface.

11. A non-transitory computer readable media containing computer executable code comprising code to perform the acts of the method of claim 1.

12. A system, comprising:
   an X.25 switch configured for direct communication with a TCP/IP based network device, the TCP/IP based network device including X.25 packet encapsulation software, wherein the X.25 packet encapsulation software encapsulates entire X.25 packets allowing routing of X.25 packets over TCP/IP connections;
   a processor communicatively coupled to the X.25 switch, the processor configured to:
      access a profile specifying at least one setting to facilitate communication with the TCP/IP based network device and provision one or more X.25 PVCs on the X.25 switch;
   a processor communicatively coupled to the TCP/IP based network device, the processor configured to:
      provision one or more PVCs on the TCP/IP based network device, and
      map, within the TCP/IP based network device, a plurality of PVCs on the TCP/IP based network to at least one X.25 PVC; and
   a physical connection between the TCP/IP based network device and the X.25 switch for routing network traffic directly between the TCP/IP based network device and the X.25 switch.

13. The system of claim 12, wherein the TCP/IP based network device is a router.

14. The system of claim 12, wherein the X.25 packet software on the TCP/IP based network device comprises Cisco X.25 Over TCP (XOT) software.

15. The system of claim 12, wherein configuring an X.25 switch for direct communication with a TCP/IP based network device comprises configuration of one or more ports to communicate with the TCP/IP based network device.

16. The system of claim 15, wherein the X.25 switch port configuration comprises setting a Data Terminal Equipment (DTE) baudrate.

17. The system of claim 15, wherein the X.25 switch port configuration comprises setting a Data Circuit-terminating Equipment (DCE) packet size.

18. The system of claim 12, wherein configuring X.25 packet encapsulation software on the TCP/IP based network device comprises setting an incoming packet size and an outgoing packet size to match a packet size of the X.25 switch.

19. The system of claim 12, wherein configuring X.25 packet encapsulation software on the TCP/IP based network device comprises assigning a X.25 address to an internal interface of the TCP/IP based network device for the use of the TCP/IP based network device, wherein the X.25 address does not comprise a real world addressable address.

20. The system of claim 12 wherein said processor communicatively coupled to the X.25 switch is different from said processor communicatively coupled to the TCP/IP based network device.

* * * * *